United States Patent [19]
Viviano

[11] Patent Number: 5,228,064
[45] Date of Patent: Jul. 13, 1993

[54] DATA TIMING RECOVERY APPARATUS AND METHOD

[75] Inventor: Jerome J. Viviano, Madison, Ala.

[73] Assignee: Universal Data Systems, Inc., Huntsville, Ala.

[21] Appl. No.: 455,123

[22] Filed: Dec. 22, 1989

[51] Int. Cl.[5] .......................... H04L 7/27; H04L 7/06
[52] U.S. Cl. ..................... 375/110; 375/114
[58] Field of Search ............... 375/110, 111, 119, 120, 375/94, 114; 328/155; 307/262, 269; 331/17, 14

[56] References Cited

U.S. PATENT DOCUMENTS

| | | | |
|---|---|---|---|
| 3,678,200 | 7/1972 | Clark | 375/114 |
| 4,029,905 | 6/1977 | Abraham | 375/110 |
| 4,087,627 | 5/1978 | Sato et al. | 375/110 |
| 4,376,309 | 3/1983 | Feuderson et al. | 375/110 X |
| 4,426,714 | 1/1984 | Ashida | 375/110 |
| 4,466,111 | 8/1984 | Bennett | 375/111 |
| 4,704,722 | 11/1987 | Henry | 375/120 |

Primary Examiner—Benedict V. Safourek
Assistant Examiner—Tesfaldet Bocure
Attorney, Agent, or Firm—Wayne J. Egan

[57] ABSTRACT

Received data information is converted into digital data by sampling the data information and making a determination of the digital state for each bit. It is important that the clock which controls the time at which each data decision is made occurs at an optimal time, i.e. at the maximum signal to noise ratio of the received data information. This invention provides an improved clock control apparatus in which the clock timing is updated only upon receipt of one of a predetermined set of data sequences to enhance optimal timing.

24 Claims, 2 Drawing Sheets

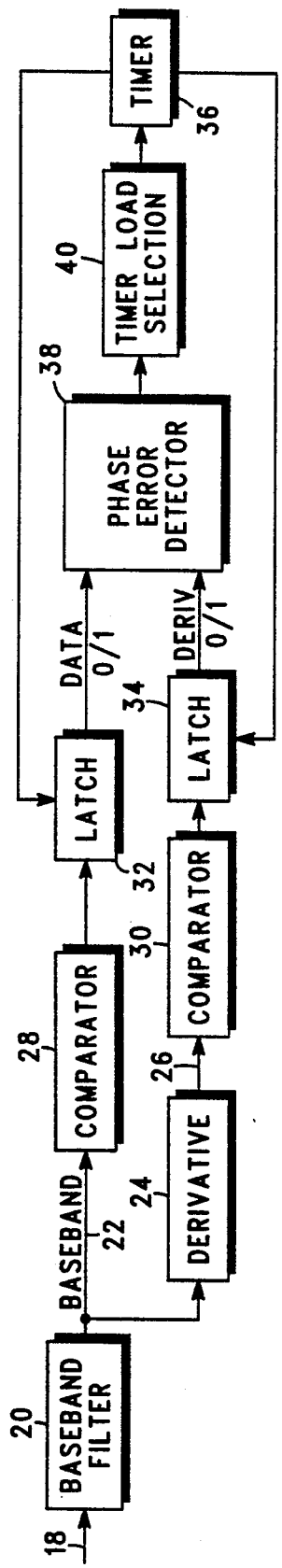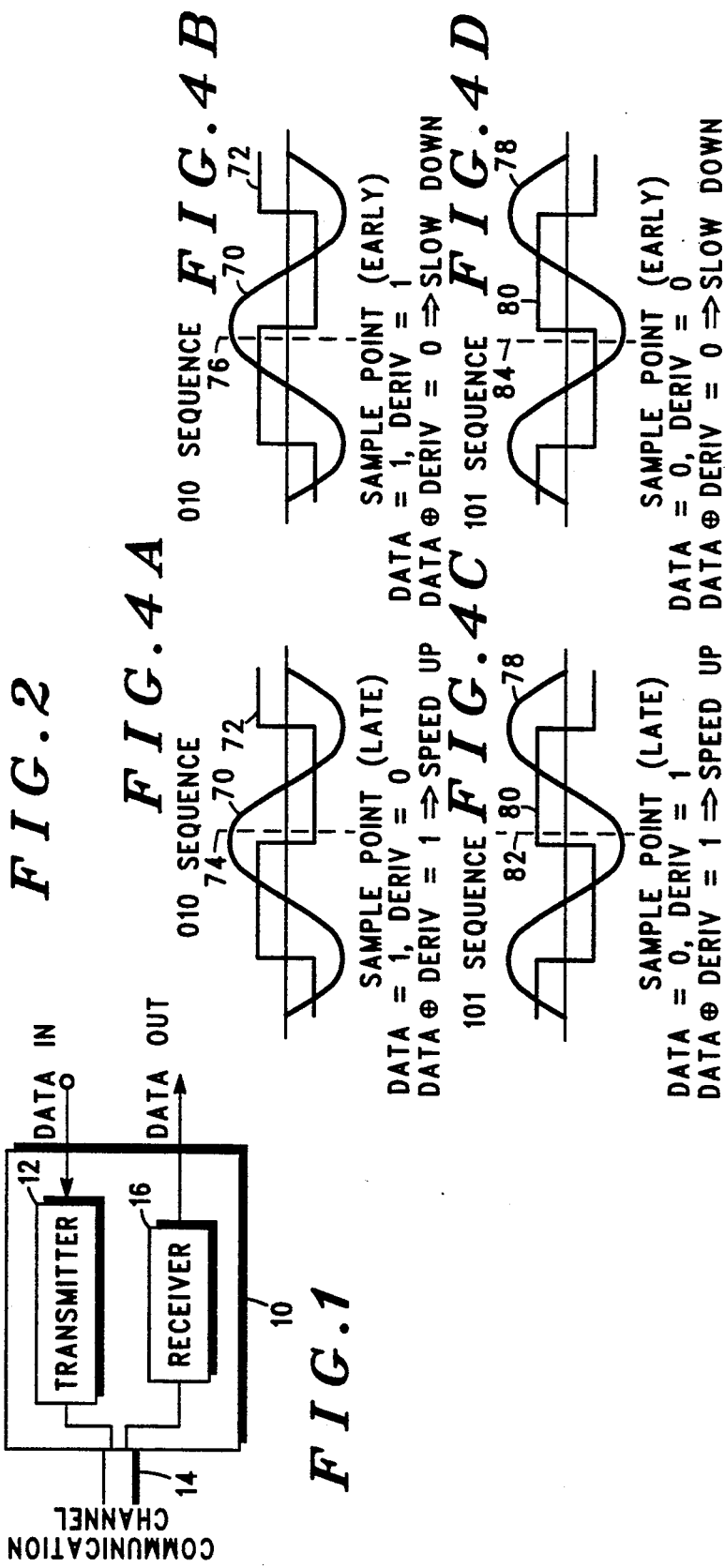

DATA TIMING RECOVERY APPARATUS AND METHOD

BACKGROUND OF THE INVENTION

This invention relates to communications systems in which timing information needed to recover data transmitted over the system must be derived. It is especially suited for timing recovery in systems where phase distortion due to the transmission channel causes asymmetrical distortion of the data waveform.

It is known in a modem data receiver to detect zero crossings of the baseband signal to determine a time reference. A baseband sampling clock can be phase locked to the zero crossings with a one half cycle delay to yield a clock for data sampling at the mid point in the cycle. However, due to transmission distortions and imperfect processing of the received signal at the receiver, the zero crossings may lead the desired sampling point by more or less than one half cycle. Such conditions produce less than optimum results since the sampling time is not at the best point.

The desired time to sample the received data signal is at the maximum signal-to-noise ratio (SNR), sometimes referred to as the maximum eye opening. Even if the sample point could be kept at the mid-cycle point, this will not produce optimum results where phase distortion has caused the data waveform to have a maximum SNR at other than the mid-cycle point.

In U.S. Pat. No. 3,440,548 the choice of the sampling instant for a synchronous digital data receiver is based on the use of the time derivative of the received data signal rather than its threshold crossings. Pattern sensitivity problems are addressed in U.S. Pat. No. 4,797,900.

It is an object of the present invention to provide an improved timing recovery apparatus which uses only selected data information from which to control the data sampling time to maximize performance.

BRIEF DESCRIPTION OF THE DRAWINGS

FIG. 1 is a block diagram of a data communications device having a data receiver which incorporates an embodiment of the present invention.

FIG. 2 is a block diagram of an embodiment of a timing recovery circuit according to the present invention.

FIGS. 4A–4D each represent a data waveform with a superimposed derivative waveform illustrating phase error detection according to the present invention.

DESCRIPTION OF THE PREFERRED EMBODIMENT

Figure 3:
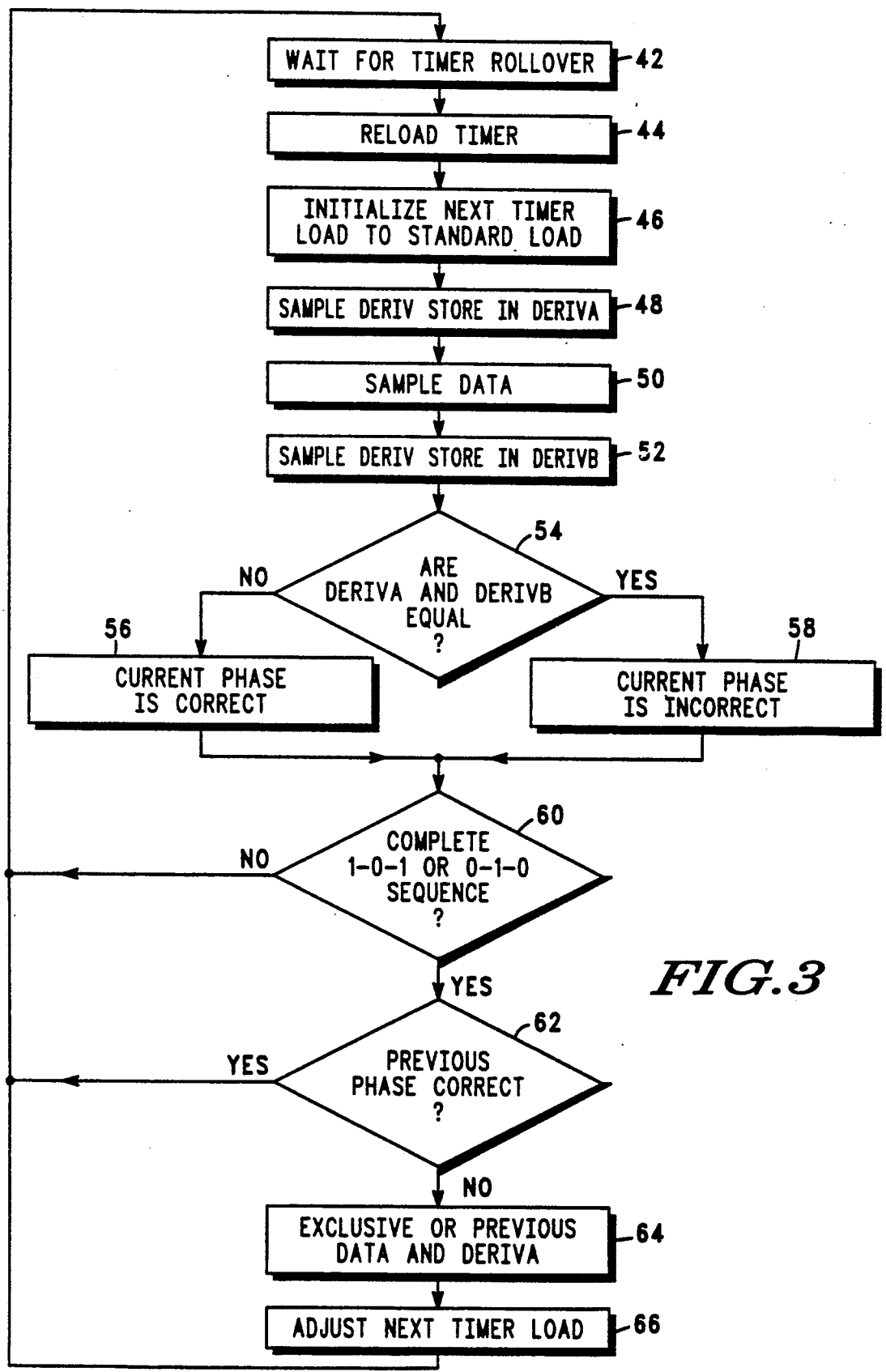
FIG. 3 is a flow diagram illustrating the steps for practicing a method according to the present invention.

FIG. 1 illustrates a digital communications apparatus 10 such as a modem which includes a transmitter 12 which receives data from a data source and transmits it over communication channel 14. A receiver 16 receives digital information over communication channel 14 and converts it to digital data. Receiver 16 must demodulate or recover data information from channel 14. The data may be transmitted over the channel from a remote transmitter by using a variety of techniques including quadrature amplitude modulation, frequency modulation, phase modulation, or direct DC signalling. Regardless of the method, receiver 16 must derive timing information in order to determine the optimum instance at which to recover the sequentially sent data.

FIG. 2 illustrates an embodiment of an apparatus according to the present invention for providing improved timing recovery in a data receiver. It will be apparent to those skilled in the art that the illustrative embodiment of a timing recovery circuit will be utilized with other conventional circuits and functions in a data receiver. A received signal 18 is filtered by bandpass filter 20 to provide a filtered baseband signal 22. A derivative circuit 24 generates the derivative signal 26 of baseband signal 22. Of course if the derivative signal is available from other circuitry the derivative stage 24 could be omitted. Comparators 28 and 30 process the baseband signal 22 and derivative signal 26, respectively, and generate binary digital signals representative of each signal.

Latches 32 and 34 are used to latch or hold the binary output of comparator 28 and 30, respectively, as determined by timer 36. The DATA output of latch 32 and the DERIV output of latch 34 comprise the sampled binary output of the baseband signal and the derivative of the baseband signal, respectively. This information is utilized by phase error detector 38 which is preferably implemented by a microprocessor associated with the data receiver. The detector 38 provides an output that controls timer load selector 40 which is utilized to load timer 36 with a variable parameter which corresponds to the sampling time instant to be utilized to detect incoming data. This parameter may consist of a number that is loaded into a counter associated with the timer.

FIG. 3 illustrates a flow diagram of a program for implementing the phase error detector function. The "wait for timer rollover" step 42 inhibits operation until the end of a data timing cycle. The "reload timer" step 44 causes the timer to be reloaded with a timing variable which will determine the start of the sampling sequence which includes the DATA sample point. In the "initialize next timer load to standard load" step 46, the timing variable which will be used in the next cycle is initialized to a predetermined standard time interval which corresponds to the anticipated data rate.

In step 48, at least the sign of the time derivative of the received signal, just prior to step 50, is stored as DERIVA for later use. In the preferred method, this information consists of a binary true or false state. In step 50 the baseband signal is sampled and a data state determination made and stored as DATA. In step 52 the derivative signal is again sampled just after step 50 and stored as DERIVB. It will be understood that steps 48, 50, and 52 occur in a time sequence such that the derivative is determined just before and after the sampling of the data (step 50). These derivatives define a range around the maximum SNR of the received data signal. This range is small relative to a bit time interval.

In step 54 the decision is determined if DERIVA and DERIVB are equal. That is, are they both false or both true? If the decision is NO, then step 56 determines that the current data bit phase is correct. If the decision is YES, then step 58 determines that the current data bit phase is incorrect. Regardless of the phase being correct or incorrect, step 60 determines if a complete 1-0-1 or 0-1-0 sequence has occurred. This sequence refers to a received data sequence. If the decision is NO, control passes to step 42 which results in the standard time being utilized for timing. If the decision is YES, a determination is made by decision step 62 as to whether the previous data bit phase was correct. This step uses the decision made by steps 56 and 58 for the preceding data cycle. If the previous phase was correct (YES), control passes to step 42 and the timer will utilize the standard time variable. If the decision is NO, the previous data bit DATA and DERIVA are exclusive-or'ed (EXOR). This step determines whether the time variable, and hence sample clock, is to be increased or decreased. In step 66 the time variable is adjusted so that the next timer reload 44 will not be the standard time load but will be an adjusted value as determined by the need to increase or decrease the clock. In the illustrative embodiment, the amount of each increase or decrease may consist of a predetermined amount. Following step 66, control passes to step 42 wherein the cycle is repeated.

An important aspect of the present invention resides in the recognition that if the DATA and DERIV signals were used to update the timer for every data bit, optimal sampling time would not result. For example, in a binary data transmission system, if the previous data sample point was substantially at the optimal point, use of the next data bit update would cause the sample point to change slightly from the optimal point since some "correction" would occur. This results in moving the sampling point from a better position to a worse position.

The present invention contemplates that the baseband data signal and derivative of that signal provide the most accurate information in which to base timing when the received data sequence is 1-0-1 or 0-1-0. These two sequences provide a symmetrical waveform relative to the middle data bit. Updating the sample clock only upon these sequences eliminates timing decisions based upon a sequence of data consisting of the same data state in which the time derivative does not provide needed information.

Returning to FIG. 3, steps 60-64 require the storage of DATA for two preceding cycles and DERIVA and DERIVB for one preceding cycle. This stored information is utilized in conjunction with the current cycle information so that the decision in step 60 and the function in step 64 can be performed. It will be recognized that if such a sequence has not occurred then no timer adjustment is made. If one of the two defined sequences has occurred as determined by step 60, step 62 makes the further determination if the previous or middle in the three data bit sequence had the correct phase. If it did have the correct phase (YES), then the timer is not adjusted. If it was not correct, then the timer adjustment is made as determined by step 64. The use of an EXOR function for the middle data bit DATA and DERIVA is utilized to determine if the clock needs to be increased or decreased.

FIGS. 4A-4D illustrate the two data waveform sequences satisfying the 1-0-1 or 0-1-0 sequence. FIGS. 4A and 4B illustrate a 0-1-0 data sequence represented by waveform 70. The binary waveform 72 is the sign of the time derivative (DERIV) of corresponding waveform 70. FIG. 4A illustrates the sample point or clock 74 as being late relative to waveform 70, that is, it does not occur at the maximum SNR of waveform 70 as indicated by the earlier transition of waveform 72. At the sample point, DATA=1, DERIV=0, EXOR of DATA with DERIV=1 which corresponds to the need to speed up the clock timing. FIG. 4B illustrates the sample point 76 as being early. At the sample point, DATA=1, DERIV=1, and EXOR or DATA and DERIV=0 which indicates the timing needs to be slowed down.

FIGS. 4C and 4D represent a 1-0-1 data sequence. FIG. 4C illustrates the data waveform 78 relative to the DERIV waveform 80. Sample point 82 is late relative to the maximum SNR of waveform 78. As shown at the sample point, DATA=0, DERIV=1 and EXOR of DATA and DERIV=1 indicating a need to speed up the clock. FIG. 4D illustrates sample point 84 occurring early wherein DATA=0, DERIV=0 and EXOR of DATA and DERIV=0 indicating the need to slow down the timing.

It will be seen by comparing the EXOR functions for the examples shown in FIGS. 4A-4D, an EXOR=1 indicates the need to speed up and a 0 the need to slow down for both the 0-1-0 and 1-0-1 data sequences. This corresponds to step 64 of FIG. 3 in which the change of speed determination is made. Either DERIVA or DERIVB could be utilized for the EXOR function in step 64 since both must have same state in order to reach step 64. This results from step 62 wherein a determination that the previous phase is correct, i.e. DERIVA and DERIVB having opposite states, would prevent the implementation of step 64.

Determining the derivative just prior to and just after the data sample point according to steps 48-52 allows a correct or incorrect phase decision to be made. The decision made by step 62 prevents "over correcting" the sample point, i.e. causing it to move away from the optimal point. This logic inhibits unnecessary corrections when the current state of operation is within acceptable limits.

Although an illustrative embodiment of the present invention has been described and illustrated in the drawings, the scope of the invention is defined by the claims which follow.

I claim:

1. A data communications apparatus comprising:
   a transmitter that converts digital data into an analog signal containing data information for transmission over a communications channel;
   a receiver that converts an analog signal including data information received via said communication channel into a corresponding sequence of digital data signals, each represented by a logic state, said receiver comprising:
   means for sampling each digital data signal of said sequence at adjustable sampling times for determining the logic state thereof at each sampling time;
   means for generating a signal representative of a time derivative of said received analog signal, said time derivative signal varying in amplitude above and below a predetermined reference level, said time derivative signal being considered of one sign when it's amplitude is above said level and of another sign when its amplitude is below said level;
   means for determining at least the sign of the time derivative signal adjacent each sampling time; and
   means for detecting at least one predetermined sequence of sampled logic states;
   means for adjusting the sampling times of said sampling based upon said at least sign of the time derivative signal and logic state of said data samples only upon detection of said at least one predetermined sequence of sampled logic states by said detecting means.

2. The apparatus according to claim 1 wherein each sampled logic state is binary and wherein said at least one predetermined sequence comprises a 0-1-0 binary sequence and a 1-0-1 binary sequence.

3. The apparatus according to claim 1 wherein each predetermined sequence has a center logic state and said adjusting means adjusts the sampling times of the sampling based only on the logic state and the sign of the data sample corresponding to the center logic state.

4. The apparatus according to claim 1 wherein said sign determining means comprises means for determining at least the sign of the time derivative signal just before and just after each sampling time, referred to hereafter as before and after signs, respectively.

5. The apparatus according to claim 4 further comprising means for inhibiting said adjusting means from adjusting the sampling times when said before and after signs are not the same.

6. The apparatus according to claim 3 wherein said predetermined sequences of logic states consist of 0-1-0 and 1-0-1.

7. An apparatus for receiving data information and for converting said data information into a sequence of digital data signals, said apparatus including means for recovering timing associated with said sequence of digital data signals comprising:
  means for generating a data sample clock of periodic sampling times corresponding to the sequence of digital data signals;
  means for determining if each sampling time of said data sample clock occurs within a predetermined range for its corresponding digital data signal;
  means for adjusting the period of the sampling times of said clock only when said determining means determines that a sampling time of said sample clock did not occur within said predetermined range of its corresponding digital data signal and said sampling later determines that the logic state of the sampled data comprises the 1 state of a 0-1-0 logic sequence or the 0 state of a 1-0-1 logic sequence.

8. The apparatus according to claim 7 wherein the data information is received as an analog signal; including means for generating a signal representative of a time derivative of said received analog signal, said time derivative signal varying in amplitude above and below a predetermined reference level, said time derivative signal being considered of one sign when it's amplitude is above said level and of another sign when it's amplitude is below said level; and wherein said determining means determines the sign of the time derivative signal just before and just after each sampling time of said data sample clock, the time interval between the before and after sign determination defining said predetermined range.

9. The apparatus according to claim 8 wherein said adjusting means adjusts the clock only when the signs of the time derivative signal determined before and after a sampling time are the same.

10. The apparatus according to claim 7 further comprising means for inhibiting said adjusting means from adjusting said clock except upon receipt of at least one predetermined sequence of digital data signals.

11. The apparatus according to claim 10 wherein each predetermined sequence includes a center digital data signal, said adjusting means adjusting said clock only based upon information associated with said center digital data signal.

12. The apparatus according to claim 11 wherein said predetermined sequences consists of a 0-1-0 and a 1-0-1 binary digital data sequence.

13. A method for recovering timing associated with a sequence of digital data signals comprising the steps of:
  generating a data sample clock of periodic sampling times corresponding to the sequence of digital data signals;
  determining if each sampling time of said data sample clock occurs within a predetermined range for its corresponding digital data signal;
  adjusting the period of the sampling times of said clock only when said determining means determines that a sampling time of said sample clock did not occur within said range of its corresponding digital data signal and said sampling later determines that the logic state of the sampled data comprises the 1 state of a 0-1-0 logic sequence or the 0 state of a 1-0-1 logic sequence.

14. The method according to claim 13 further comprising the step of inhibiting said adjustment of said clock except upon receipt of one of at least one predetermined sequence of digital data signals.

15. The method according to claim 14 wherein each predetermined sequence includes a center digital data signal, said adjusting step adjusting said clock only based upon information associated with said center digital data signal.

16. The method according to claim 14 wherein said predetermined sequences consists of a 0-1-0 and a 1-0-1 binary digital data sequence.

17. A data receiver that converts a received analog signal, the received analog signal containing data information into a corresponding sequence of digital data signals, each represented by a logic state, said receiver comprising:
  means for sampling each digital data signal of said sequence at sampling times for determining the logic state thereof at each sampling time, the time interval between each sampling time being adjustable;
  means for detecting at least one predetermined sequence of digital data signals;
  means for adjusting the time intervals between the sampling times of said sampling upon detection of one of said predetermined data sequences.

18. The receiver according to claim 17 wherein the logic states of said digital data signals are binary and wherein said predetermined sequences comprises a 0-1-0 binary sequence and a 1-0-1 binary sequence.

19. The receiver according to claim 17 wherein the logic states of said digital data signals are binary and wherein said predetermined sequences consists of a 0-1-0 binary sequence and a 1-0-1 binary sequence.

20. The receiver according to claim 17 wherein said adjusting means adjusts the sampling times of said sampling only upon each detection of one of said predetermined data sequences.

21. In a data receiver arranged for converting a received analog signal containing data information into a corresponding sequence of digital data signals, a method for recovering timing associated with a sequence of digital data signals, each represented by a logic state, said method comprising the steps of:
  sampling each digital data signal of said sequence at sampling times having adjustable time intervals therebetween;
  determining the logic state of data corresponding to said sampling time;
  detecting one predetermined sequence of digital data signals;

adjusting the time intervals between the sampling times of said sampling upon detection of one of the predetermined data sequences.

22. The method according to claim 21 wherein the logic states of said data are binary and wherein said predetermined data sequences comprises a 0-1-0 binary sequence and a 1-0-1 binary sequence.

23. The method according to claim 21 wherein the logic states of said data are binary and wherein said predetermined data sequences consists of a 0-1-0 binary sequence and a 1-0-1 binary sequence.

24. The method according to claim 21 wherein said adjusting step adjusts the timing of said sampling only upon each detection of one of said predetermined data sequences.

* * * * *

UNITED STATES PATENT AND TRADEMARK OFFICE
CERTIFICATE OF CORRECTION

PATENT NO. : 5,228,064

DATED : July 13, 1993

INVENTOR(S) : Jerome J. Viviano

It is certified that error appears in the above-identified patent and that said Letters Patent is hereby corrected as shown below:

At column 3, line 66, "or" should be --of--.

Signed and Sealed this

Fifth Day of April, 1994

Attest:

BRUCE LEHMAN

Attesting Officer

Commissioner of Patents and Trademarks